United States Patent
Mayne et al.

[11] 3,713,084
[45] Jan. 23, 1973

[54] METHOD OF POLARITY DETERMINATION OF MARINE HYDROPHONE STREAMERS

[75] Inventors: William H. Mayne; Roy G. Quay, both of San Antonio, Tex.

[73] Assignee: Petty Geophysical Engineering Company, San Antonio, Tex.

[22] Filed: June 8, 1970

[21] Appl. No.: 44,379

[52] U.S. Cl..................340/7 R, 340/3 T, 340/4 A, 340/16 P, 324/133, 181/.5 NP
[51] Int. Cl. ..............................................G01v 1/38
[58] Field of Search..........340/3 T, 4 A, 7 R, 9, 16 P; 181/.5 NP, .5 AC; 324/133

[56] References Cited

UNITED STATES PATENTS

| | | | |
|---|---|---|---|
| 2,581,994 | 1/1952 | Winterhalter | 340/7 R |
| 3,135,944 | 6/1964 | Ehrlich | 340/9 |
| 3,539,979 | 11/1970 | Crall | 340/8 S |
| 3,566,346 | 2/1971 | Scopatz | 340/8 S |

Primary Examiner—Benjamin A. Borchelt
Assistant Examiner—N. Moskowitz
Attorney—Arnold, White & Durkee, Frank S. Vaden, Paul Van Slyke and Tom Arnold

[57] ABSTRACT

Method of the determination of the polarity of marine seismic hydrophone streamers whereby detectors in said streamers are accurately and quickly excited. Signals from said detectors are recorded before deployment of said streamer into the water. This invention provides for the use of a low frequency sound source in the air near a hydrophone streamer while onboard a seagoing vessel. The low frequency of the pressure source is adequately selected to allow similar responses from the receiving detectors within the hydrophone streamer. In order to achieve this similarity of response, the wavelength emitted from the source must be more than twice the difference of subtracting the maximum source-to-detector distance and the minimum source-to-detector distance of the streamer, as confined compactly onboard.

7 Claims, 2 Drawing Figures

PATENTED JAN 23 1973　　　　　　　　　　　　　3,713,084
FIGURE 1
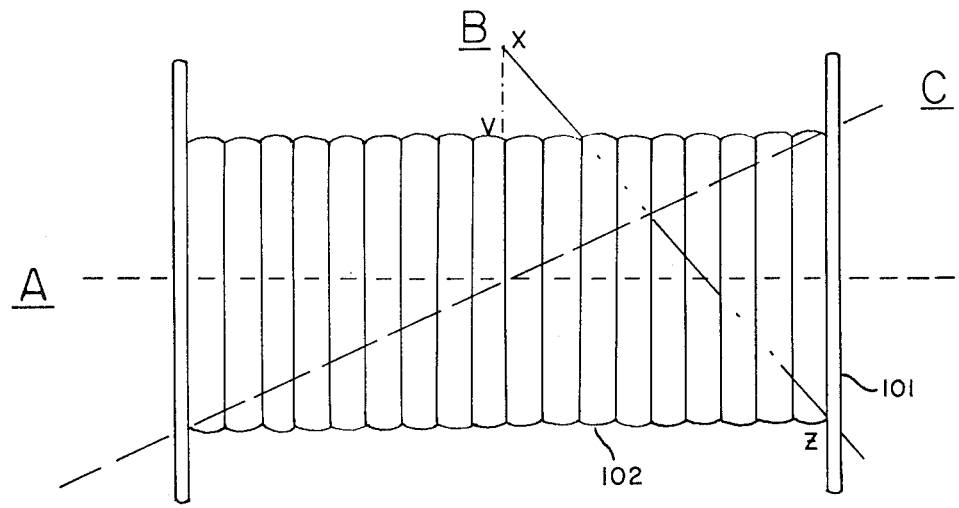
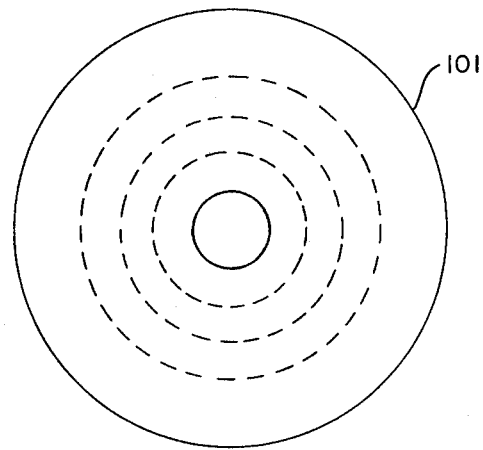
INVENTORS,
*William H. Mayne*
WILLIAM H. MAYNE
*Roy G. Quay*
ROY G. QUAY
FIGURE 2

3,713,084

METHOD OF POLARITY DETERMINATION OF MARINE HYDROPHONE STREAMERS

BACKGROUND OF THE INVENTION

This invention relates to a method of enhancing the seismic exploration of geological structures beneath bodies of water. More particularly, the invention relates to a checking system whereby the polarity of each group of pressure-activated devices within marine seismic cable can be easily and conveniently determined prior to deployment of the cable into the water.

It is a common practice in geophysical prospecting for oil to tow over the water-covered survey area a submerged electrical cable containing a plurality of devices which respond to pressure waves generated in the water. Such cables are disclosed for example, in U. S. Pat. No. 2,465,969, issued Mar. 29, 1949, to Lee Roy C. Paslay; in U. S. Pat. No. 3,299,397, issued Jan. 17, 1967, to G. M. Pavey, Jr.; in U. S. Pat. No. 3,436,722, issued Apr. 1, 1969, to Booth B. Strange; and in U. S. Pat. No. 3,441,902, issued Apr. 29, 1969, to Carl H. Savit.

Such pressure waves are most commonly generated within the water by explosives, acoustical energy sources, or by vibratory means. For example, U. S. Pat. No. 3,249,177, issued May 3, 1966, and U. S. Pat. No. 3,310,128, issued Mar. 21, 1967, both to Stephen V. Chelminski.

The pressure waves are propagated downwardly and outwardly from the seismic energy source. Those waves passing downwardly will transverse the water and subsurface formations of the earth underlying the water. As the waves encounter changes in the nature of those formations traversed, a portion of the energy in the waves will be deflected upwardly and will be received by the pressure-responsive devices carried within the electrical cable. Such pressure-activated devices are commonly called detectors, hydrophones, transducers, or seismometers. The reflected waves are received by the transducers at a time measured from their emission which is indicative of the depth from which they are reflected. Thus, a repetition of this process and subsequent measurements of such time repeated at many locations of an area will allow interpretations as to the depth and the attitude of geological phenomena which may contain large accumulations of petroleum.

Commonly employed methods and apparatus for the heretofore mentioned geophysical surveying in water-covered areas are described in U. S. Pat. No. 2,359,696, issued Mar. 29, 1949, to Lee Roy C. Palsay and in U. S. Pat. No. 3,414,874, issued Dec. 3, 1968, to Kenneth W. McLoad.

The initial installation of the electronic system, including the recording apparatus, and the pressure-activated devices, will need polarity determinations and a subsequent matching of polarities. Likewise, when returning to an area in which seismic prospecting has been previously achieved, the desire to duplicate polarities between old and new seismic recordings is a necessary requirement.

In the daily operations of a seismic surveying crew in a water-covered area, there are many possible mishaps which may occur and cause damage to the hydrophone streamer. For example, the stress applied to the cable in towing may result in destructive strain, i.e., broken wiring, which would cause repair work to be initiated on the cable. Other possible reasons for cable repair work are the striking of the cable against submerged objects, passing vessels, or the bottom. Likewise, the various forms of chemical and mechanical weathering may also effect damage to the marine cable.

Modern day techniques of seismic exploration require hydrophone streamers to be in excess of one mile in length. In order to repair portions of the cable away from the towing vessel, the streamer is generally wound about a sizable spool, often having dimensions in excess of twelve feet. If the damage has occurred near the end of the cable nearest the boat, the polarity could be accidentally reversed for detectors more remote from the boat.

Likewise, the spacing of the detectors within a given group and the weighted efficiency of such a grouping are preselected in order to attenuate that energy projected from the pressure source directly through the water medium to the pressure-activated devices. Identification of the polarity of the first arrivals of pressure is difficult for those groups near the pressure source, and indeed impossible for those groupings far from said source. The incapability of polarity determination is likewise heightened by the utilization of pressure sources of low magnitude, and by the employment of sophisticated seismic data processing techniques.

At present, as far as it is known, there is no convenient and reliable manner of verifying the polarity identity among the pressure-activated devices within the hydrophone cable nor the absolute polarity of the cable as a whole. The present invention offers a means for such determinations.

SUMMARY OF THE INVENTION

This invention relates to a method of verifying the proper polarity of pressure-activated devices within a hydrophone streamer. A low frequency acoustical energy source is utilized for that portion of the marine cable on-board and placed into a restricted area. The energy source is excited, the pressure-activated devices thus stimulated, and a recording made of their responses.

It is noteworthy that the frequency of the pressure source should be low in nature, in order to facilitate uniformity of response among the various pressure-activated devices. Likewise, the predominant wavelength of the acoustical source must be at least twice the difference in distance between the near and far receiving stations or detector groups of the hydrophone streamer, as restricted onboard the towing vessel. Hence, if the streamer be twined about a reel, the difference in distance between extremes of the cable in relative position to the source, would be the length sought above.

BRIEF DESCRIPTION OF THE DRAWING

In an effort to facilitate the discussion of the preferred embodiments of the invention, FIGS. 1 and 2 are presented.

FIG. 1 illustrates a cable reel with several layers of electrical cable wound about it and three possible sound source positions.

FIG. 2 exhibits an alternative view of the cable reel in FIG. 1.

DESCRIPTION OF THE PREFERRED EMBODIMENTS OF THE INVENTION

As heretofore mentioned, polarity determinations should be initiated to determine absolute polarity of the system, and also to confirm that all repair work shall have been correctly completed on the hydrophone streamer.

When, in water seismic surveying, a need for repair work on the hydrophone streamer is necessary, a portion of the electrical cable is retrieved from the water and wound simultaneously, about a large cable reel. The portion retrieved is that necessary to bring the damaged portion of the cable into a position on deck whereby repair work can be effected.

Within the hydrophone cable, single or multiple pressure-activated devices are connected in such a manner that two wires represent the given single or multiple devices and these two wires are connected to recording apparatus onboard the towing vessel. Hence, for each channel of recorded data, there exist two wires which convey electrical impulses from a group of pressure-activated devices.

During the repairing procedure, such electrical wires are often found to be disconnected, or they are inadvertently severed, or they are purposely segmented to affect the given repair work, or spare pairs of wires within the cable are substituted for defective wires. Whenever alterations have been effected, there is a distinct possibility that a reversal in polarity has resulted in the recently joined pairs of electrical wires. Normally, such reversals in polarity cannot be detected. If the entire cable is wound on the reel, the present invention makes it possible to simultaneously check the polarity of all detectors.

The present invention can be utilized once repair work is finalized on the cable. Here, the cable is wound about the cable reel several feet in thickness, and therefore, contact handling is impossible. However, by the use of an acoustical energy source near the cable reel, and onboard the vessel, a low frequency pressure wave can be generated. The said pressure wave stimulates the pressure-activated devices within the hydrophone streamer and a recording is made onboard the towing vessel. Thus any reversals in polarity of the single or multiple-grouped pressure-activated devices can be determined while the electrical cable is still wound about the cable reel or spool. The present invention will become more meaningful in the detailing of FIGS. 1 and 2 hereinbelow.

In FIGS. 1, several thicknesses of electrical cable have been wound about cable reel 101 and only the outermost layer is visible.

To those skilled in the art, the physical fact that the pressure-activated devices are distributed over the entire electrical cable is well-known. If such devices are located at any distance apart whatsoever, the pressure waves which stimulate said devices will be received at various stages of phasing or at multiple cycles. Thus, the recording resulting from such devices located appreciable distances apart would be filled with ambiguous information and therefore be useless in a polarity checking system. However, for the portion of the electrical cable entwined, the distance is diminished from hundreds of feet to less than twenty feet, in most cases.

The formula $$L \cdot f = v \qquad (1)$$

is well-known to the art, where $L$ is the wavelength in feet per cycle, $f$ is the frequency in cycles per second and $v$ is the velocity in feet per second.

In an effort to further attenuate ambiguity in recording the responses of the pressure-activated devices to sound source B located near cable reel 101, a low frequency acoustical source should be utilized. Hence, the speed of sound in air at sea level is approximately 1,100 feet per second, and if the frequency is twenty cycles per second, the wavelength, by mathematical solution of equation (1), is approximately 55 feet per cycle.
Thus:

$L = 1,100$ feet per second/20 cycles per second $= 55$ feet per cycle

Such a long wavelength being emitted from acoustical source B is necessary when the distance over which the cable is spread, being wound in several layers of thickness about cable reel 101, is on the order of less than twenty feet. The wavelength of source B should be more than twice the difference between distance XZ and distance XV. Distance XZ is from source B to detector farthest from source B. Distance XV is from source B to detector V nearest source B. It is noteworthy that the farther source position B is from cable reel 101, the smaller the difference in distances XV and XZ will be.

All hydrophones within the streamer would thus receive the pressure waves within a given wavelet, and at near phase identity. Mathematical computations on the wave phase actually received by the individual pressure-activated devices, or the grouped pressure-activated devices will verify the heretofore drawn conclusions.

The question arises as to the need for a twenty cycle per second frequency, used above in the solution of equation (1). In seismic prospecting in water-covered areas, there are many sources of pressure waves, for example, wind, motion of the vessel, electrical apparatus onboard the vessel, motors, compressors, et cetera. It is necessary that the acoustical source frequency be a low frequency, such as twenty cycles per second, in order that the wavelength be of a sufficient length, and clearly distinguishable from the noises generated by these devices.

The acoustical source might be of many types. One adequate source is a closed pipe, similar to an organ pipe, connected to an air compressor. Another might be an air gun used in the exploration process, hoisted above the water line. Yet another source might be some sort of a collar placed about the cable reel, thus giving a greater uniformity of source-to-detector distance for phase identity among the receiving devices.

In FIGS. 1, three source positions A, B and C are illustrated near cable reel 101. It is noteworthy that several layers of thickness of hydrophone streamer have been entwined, and the various source-to-detector paths are exhibited. Source position C represents an oblique source-to-detector path. As such, the differential distance between the pressure-activated devices nearest to source position C and those devices farthest from source position C is a maximum in length.

Thus, the ambiguity in the recording of a polarity test would be the greatest at this point. Likewise, source position A offers a long differential source-to-receiver distance, but such a path is less than that of source C. Finally, a source located at source position B would be the most ideal position illustrated, as the differential distance between receivers V and Z and source B is the shortest in length of the three examples.

Hence, an acoustical source, such as an air gun hoisted to position B, above the water line, and excited in such a manner as to yield a pressure wave of appropriate wavelength, would be the most practical mode of producing the needed acoustical energy. Once the source is activated, the pressure responding devices are stimulated, and a recording effected by the appropriate equipment onboard the towing vessel. Phase meters could be utilized to automatically determine the difference between an absolute polarity or reference channel and each given recording channel.

In practice, the polarity check would be performed immediately before placing the hydrophone streamer into the water. Then if a repair is made, it may not be considered necessary to retrieve the streamer, place it onto the cable reel to recheck the polarity, particularly if the given traverse is near completion. The log or report of the recording operator is to include the location of the repair procedure. When the transverse has been completed, the hydrophone streamer is again subjected to the polarity determination of all pressure-activated devices or groups of said devices. If the polarity should prove to be incorrect for any grouping, the polarity of said grouping can be restored to correct polarity during the processing of the data which was so reversed in polarity. It is noteworthy that after the alteration of the polarity of groupings previously reversed in polarity, that a subsequent polarity determination will be deemed necessary prior to placing the hydrophone streamer into the water. Hence, absolute certainty of polarity is achieved.

It is noteworthy, that due to the thickness of streamer layers twined about cable reel 101, as pictured in FIG. 2, there is no physical way to have identical source-to-detector paths for all the hydrophones within the given streamer. However, a collar placed about the cable reel, as heretofore mentioned, and utilized as an acoustical source, would approach the ideal situation. Similarly, a closed pipe source placed through the core of cable reel 101 in FIG. 2, along the source position A axis in FIG. 1, would also approach the ideal situation.

It should be noted that an air gun has a transient response, thus making an air gun perhaps more desirable as a source than other heretofore mentioned alternatives. If an air gun is utilized, a high-cut filter can effectively attenuate those frequencies above thirty cycles per second or other frequencies inappropriate for the purpose. A powerful loud speaker and amplifier system driven by a suitable signal generator could also be used.

Likewise, the electric able hereinabove mentioned in connection with the invention need not be coiled about an object, such as cable reel 101. Such a streamer might be coiled in a figure eight or a manner similar to a garden hose or rope upon the deck of the towing vessel. However, its dimensions once coiled should be appreciably shorter than one-half of the emitted wavelength of the acoustical source.

If a continuous source, such as an organ pipe or a whistle, is used, a special procedure is required to obtain absolute polarity of the pressure-activated devices. Such procedure would include an additional reference pressure-sensitive device plus a reference recording channel for such device. The absolute polarity of this additional device could be determined by applying an impulsive compressional force to the additional pressure device and the output recorded, and compared to that of the normal, non-specialized procedure, as heretofore discussed.

Phase meters can be connected between one channel, such as the reference channel, and each of the recording channels to indicate the phase of said channel. Preferably, these meters would be placed in such a circuity position as to follow the filters used in attenuating higher frequencies. A series of scribing or writing devices, such as inking pens, could be used to make a recording which would indicate inphase or out-of-phase conditions.

The preferred form of the invention is to record the pressure waves from the acoustic source by the recording equipment in a machine readable form. This recorded data from the source can then be inputed into a property-programmed electronic computer. The polarity of all recording channels could then be determined by correlation methods and those channels having reversals in polarity appropriately noted and altered during the automatic processing of such recording channels.

The hereinabove detailed specification has been cited as being exemplary of the herein present invention. However, such conditions as expressed as examples are not to be inferred as limitations on the invention. Thus, to those skilled in the art, there are many obvious alternations and possibilities within the scope of this invention.

Having described the new invention hereinabove, what is new and desirous, for which Letters Patent is sought, is as follows:

1. A method of determining the polarities of the seismic detectors within a hydrophone cable including:
    placing said cable into a coiled configuration,
    producing an acoustical signal having a wavelength in air more than twice the maximum difference in path length between any two seismic detectors and the source of said acoustical signal,
    simultaneously recording the responses from said seismic detector groups.

2. A method according to claim 1 including the attenuating of high frequency components of said responses received by said seismic detectors.

3. A method according to claim 1 including the coiling of said hydrophone streamer onto a suitable apparatus.

4. A method according to claim 1 wherein the dimensions of the coiled configuration of said cable are smaller than one-half of the acoustical signal produced.

5. The method of recording the signals received by seismic detectors within a hydrophone cable including:
    placing the cable into a coiled configuration,
    producing a change in the compressive force applied to said cable,
    simultaneously recording the responses from said seismic detectors to said change in compressive force.

6. A method according to claim 5 including the attenuating of high frequency components of said responses received by said seismic detectors.

7. A method according to claim 5 including the coiling of said hydrophone streamer onto a suitable apparatus.

* * * * *